United States Patent
Lee

(10) Patent No.: US 11,989,446 B2
(45) Date of Patent: May 21, 2024

(54) HOST DEVICE, STORAGE DEVICE, AND METHOD OF OPERATING THE SAME

(71) Applicant: SK hynix Inc., Gyeonggi-do (KR)

(72) Inventor: Hyun Woo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/546,863

(22) Filed: Dec. 9, 2021

(65) Prior Publication Data

US 2022/0413753 A1 Dec. 29, 2022

(30) Foreign Application Priority Data

Jun. 23, 2021 (KR) .................... 10-2021-0081805

(51) Int. Cl.
*G06F 3/06* (2006.01)
*G06F 12/02* (2006.01)
*G06F 12/0871* (2016.01)

(52) U.S. Cl.
CPC .......... *G06F 3/0656* (2013.01); *G06F 3/0604* (2013.01); *G06F 3/064* (2013.01); *G06F 3/0659* (2013.01); *G06F 3/0673* (2013.01); *G06F 12/0246* (2013.01); *G06F 12/0871* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2005/0268052 A1* | 12/2005 | Hepkin | G06F 12/0866 711/170 |
| 2009/0031072 A1* | 1/2009 | Sartore | G06F 12/0868 711/E12.002 |
| 2011/0289137 A1* | 11/2011 | Ittah | G06F 12/0888 711/138 |
| 2015/0081967 A1* | 3/2015 | Pan | G06F 3/0689 711/114 |
| 2015/0134886 A1* | 5/2015 | Kim | G06F 3/0656 711/173 |
| 2016/0196208 A1* | 7/2016 | Choi | G06F 12/0646 711/171 |
| 2017/0031822 A1* | 2/2017 | Ma | G06F 12/0895 |
| 2017/0300415 A1* | 10/2017 | Bonen | G06F 13/1678 |

(Continued)

FOREIGN PATENT DOCUMENTS

KR 10-2015-0055413 A 5/2015
KR 10-2015-0125486 A 11/2015

*Primary Examiner* — Stephanie Wu
(74) *Attorney, Agent, or Firm* — IP & T GROUP LLP

(57) ABSTRACT

The present technology relates to a storage device that allows access to the storage device without accessing a main memory of a host by allocating a portion of a mapping area of a buffer memory to a cache area. The storage device includes a memory device including a plurality of memory cells, a memory controller configured to control an operation performed on the memory device, and a buffer memory including a cache area and a mapping area in which mapping data indicating a mapping relationship between a logical block address and a physical block address corresponding to the operation is stored. The buffer memory allocates a portion of the mapping area to the cache area according to an allocation request received from a host, and stores data except for the mapping data in the cache area.

20 Claims, 11 Drawing Sheets

(56) References Cited

U.S. PATENT DOCUMENTS

2018/0074727 A1\* 3/2018 Zhao ................. G06F 9/544
2018/0285275 A1\* 10/2018 Barczak ............ G06F 12/0871
2021/0191868 A1\* 6/2021 Ray .................. G06F 9/3887

\* cited by examiner

HOST DEVICE, STORAGE DEVICE, AND METHOD OF OPERATING THE SAME

CROSS-REFERENCE TO RELATED APPLICATION

The present application claims priority under 35 U.S.C. § 119(a) to Korean patent application number 10-2021-0081805, filed on Jun. 23, 2021, and which is incorporated herein by reference in its entirety.

BACKGROUND

Field of Invention

The present disclosure relates to an electronic device, and more particularly, to a host device, a storage device, and a method of operating the same.

Description of Related Art

A storage device is a device that stores data under control of a host device such as a computer, a smart phone, or a smart pad. The storage device includes a device that stores data in a magnetic disk such as a hard disk drive (HDD), a device that stores data in a semiconductor memory such as a solid state drive (SSD), or a memory card, in particular, a nonvolatile memory.

The storage device may include a memory device in which data is stored and a memory controller that stores data in the memory device. The memory device may be classified into a volatile memory and a nonvolatile memory. Here, the nonvolatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

SUMMARY

An embodiment of the present disclosure provides a storage device and a method of operating the same, which allow access to the storage device without accessing a main memory of a host by allocating a portion of a mapping area of a buffer memory to a cache area.

According to an embodiment of the present disclosure, a storage device may include a memory device including a plurality of memory cells, a memory controller configured to control an operation performed on the memory device, and a buffer memory including a cache area and a mapping area in which mapping data indicating a mapping relationship between a logical block address and a physical block address corresponding to the operation is stored. The buffer memory is configured to allocate a portion of the mapping area to the cache area according to an allocation request received from a host and configured to store data except for the mapping data in the cache area.

According to an embodiment of the present disclosure, a method of operating a storage device including a memory device including a plurality of memory cells, a memory controller controlling an operation performed on the memory device, and a buffer memory may include receiving an allocation request instructing to divide and allocate areas included in the buffer memory from a host, allocating to a cache area, a portion of a mapping area in which mapping data indicating a mapping relationship between a logical block address and a physical block address corresponding to the operation is stored according to the allocation request, and storing data except for the mapping data in the cache area.

According to an embodiment of the present disclosure, a host device may include a central processing unit configured to execute and process an operation to be performed on a storage device, a main memory configured to store data corresponding to the operation processed by the central processing unit, a graphics processing unit configured to process a graphic operation and output a result value, and a graphics memory configured to store the result value. The central processing unit is further configured to output an allocation request for requesting to allocate a portion of a mapping area of a buffer memory included in the storage device to a cache area of the buffer memory.

According to an embodiment of the present disclosure, a data processing system may include a host configured to output a request, and a storage device including a volatile memory device and a nonvolatile storage device and configured to adjust in response to the request, a size of an area within the volatile memory device. The host is further configured to directly access the area to temporarily store data that is to be programmed in the nonvolatile storage device.

According to the present technology, an operation speed of the host and the storage device may be improved by allocating a portion of the buffer memory to the cache area and caching data to be output from the host or data to be output from the memory device in the cache area, in advance.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
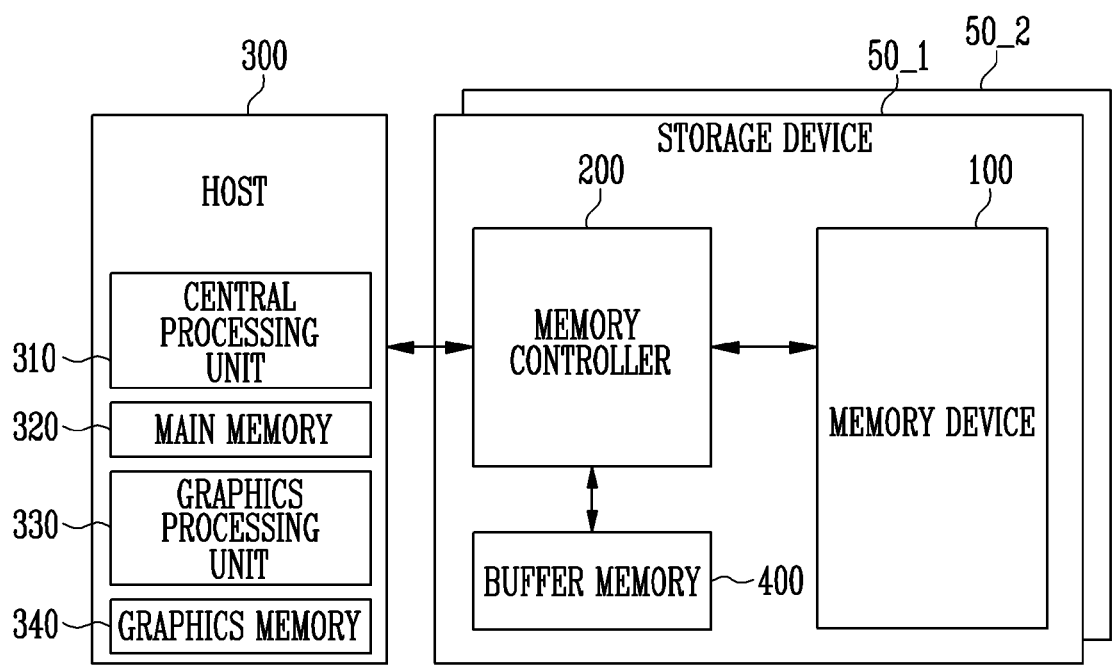
FIG. 1 is a block diagram illustrating a storage device according to an embodiment of the present disclosure.

FIG. 1 is a block diagram illustrating a storage device according to an embodiment of the present disclosure.

Referring to FIG. 1, each of first and second storage devices 50_1 and 50_2 may include a memory device 100 and a memory controller 200. In FIG. 1, only the first and second storage devices 50_1 and 50_2 are shown, but a lesser number or a greater number of storage devices may be connected to and communicate with a host 300.

Each of the first and second storage devices 50_1 and 50_2 may be a device that stores data under control of the host 300 such as a cellular phone, a smartphone, an MP3 player, a laptop computer, a desktop computer, a game player, a TV, a tablet PC, or an in-vehicle infotainment system.

Each of the first and second storage devices 50_1 and 50_2 may be manufactured as any of various types of storage devices according to a host interface that is a communication method with the host 300. For example, the first and second storage devices 50_1 and 50_2 may be configured as any of various types of storage devices such as an SSD, a multimedia card in a form of an MMC, an eMMC, an RS-MMC and a micro-MMC, a secure digital card in a form of an SD, a mini-SD and a microSD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

Each of the first and second storage devices 50_1 and 50_2 may be manufactured as any of various types of packages. For example, the first and second storage devices 50_1 and 50_2 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates in response to control of the memory controller 200. The memory device 100 may include a memory cell array including a plurality of memory cells storing the data. The memory cell array may include a plurality of memory blocks. Each of the memory blocks may include a plurality of memory cells, and the plurality of memory cells may configure a plurality of pages. In an embodiment, a page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may be implemented as a two-dimensional array structure or a three-dimensional array structure. Hereinafter, the three-dimensional array structure is described as an embodiment, but the present disclosure is not limited to the three-dimensional array structure. The present disclosure may be applied not only to a flash memory device in which a charge storage layer is configured of a conductive floating gate (FG), but also to a charge trap flash (CTF) in which the charge storage layer is configured of an insulating film.

In an embodiment, the memory device 100 may operate in a single level cell (SLC) method in which one data bit is stored in one memory cell. Alternatively, the memory device 100 may operate in a method of storing at least two data bits in one memory cell. For example, the memory device 100 may operate in a multi-level cell (MLC) method of storing two data bits in one memory cell, a triple level cell (TLC) method of storing three data bits in one memory cell, or a quadruple level cell (QLC) method of storing four data bits in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write operation (program operation), a read operation, or an erase operation according to the received command. For example, when a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may control an overall operation of the first and second storage devices 50_1 and 50_2.

When a power voltage is applied to the first and second storage devices 50_1 and 50_2, the memory controller 200 may execute firmware. When the memory device 100 is a flash memory device 100, the memory controller 200 may operate firmware such as a flash translation layer (FTL) for controlling communication between the host 300 and the memory device 100.

In an embodiment, the memory controller 200 may include firmware (not shown) that may receive data and a logical block address (LBA) from the host 300 and convert the LBA into a physical block address (PBA) indicating an address of memory cells in which data included in the memory device 100 is to be stored. In addition, the memory controller 200 may store a logical-physical address mapping table configuring a mapping relationship between the LBA and the PBA in a buffer memory 400.

The memory controller 200 may control the memory device 100 to perform the program operation, the read operation, the erase operation, or the like according to the request of the host 300. For example, when a program request is received from the host 300, the memory controller 200 may convert the program request into a program command, and may provide the program command, the PBA, and data to the memory device 100. When a read request is received from the host 300 together with the LBA, the memory controller 200 may change the read request into a read command, select a PBA corresponding to the LBA, and then provide the read command and the PBA to the memory device 100. When an erase request is received from the host 300 together with the LBA, the memory controller 200 may change the erase request into an erase command, select a PBA corresponding to the LBA, and then provide the erase command and the PBA to the memory device 100.

In an embodiment, the memory controller 200 may generate and transmit the program command, the address, and the data to the memory device 100 without the request from the host 300. For example, the memory controller 200 may provide the command, the address, and the data to the memory device 100 to perform background operations such as a program operation for wear leveling and a program operation for garbage collection.

In an embodiment, each of the first and second storage devices 50_1 and 50_2 may further include the buffer memory 400. The memory controller 200 may control data exchange between the host 300 and the buffer memory 400. Alternatively, the memory controller 200 may temporarily store system data for controlling the memory device 100 in the buffer memory 400. For example, the memory controller 200 may temporarily store data input from the host 300 in the buffer memory 400, and then transmit the data temporarily stored in the buffer memory 400 to the memory device 100.

In various embodiments, the buffer memory 400 may be used as an operation memory and a cache memory of the memory controller 200. The buffer memory 400 may store codes or commands executed by the memory controller 200. Alternatively, the buffer memory 400 may store data processed by the memory controller 200.

In an embodiment, the buffer memory 400 may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In various embodiments, the buffer memory 400 may be connected from an outside of the first and second storage devices 50_1 and 50_2. In this case, the volatile memory devices connected to the outside of the first and second storage devices 50_1 and 50_2 may serve as the buffer memory 400.

In an embodiment, the memory controller 200 may control at least two or more memory devices. In this case, the memory controller 200 may control the memory devices according to an interleaving method in order to improve operation performance.

The host 300 may communicate with the first and second storage devices 50_1 and 50_2 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 300 may include a central processing unit (CPU) 310 and a main memory 320. The CPU 310 may control an operation of the first and second storage devices 50_1 and 50_2. In addition, the main memory 320 may be configured of a double data rate synchronous dynamic random access memory (DDR SDRAM) or the like.

For example, the CPU 310 may execute and process an operation to be performed on the first and second storage devices 50_1 and 50_2. Specifically, the CPU 310 may receive command from an outside, interpret and operate the command in an order in which the command is input, that is, in a serial method, and output the command to the outside. The main memory 320 may improve an operation speed by processing an operation to be processed by the CPU 310 instead.

In an embodiment, the host 300 may include a graphics processing unit (GPU) 330 and a graphics memory 340. The GPU 330 may process a graphic operation and output a result value. In addition, the graphics memory 340 may be configured as a graphics DDR SDRAM (GDDR SDRAM).

For example, the GPU 330 may perform a graphic operation in a parallel method of processing several commands at once. That is, the GPU 330 may process image information or output the image information to a screen in order to assist a graphic process of the CPU 310. The graphics memory 340 may store a graphic operation process result value processed by the GPU 330.

In an embodiment, the CPU 310 and the GPU 330 may be applied to machine learning or deep learning. Here, the machine learning may mean analyzing data using an algorithm and performing determination or prediction based on a content learned through the analysis. In addition, the deep learning may be a form of artificial intelligence, and may mean learning data using an information input/output layer. There is a difference between the machine learning and the deep learning in that the machine learning is required to manually provide data to be trained, but deep learning may learn data to be used for classification by itself.

In an embodiment, a graphic operation speed may be improved by operating data in parallel through the GPU 330. In addition, since an operation speed of the CPU 310 may be high or an operation speed of the GPU 330 may be high in a specific situation, an optimal operation speed may be secured in various situations by adjusting performance of the CPU 310 and the GPU 330 through the machine learning or the deep learning.

Furthermore, in the present disclosure, a method in which the CPU 310 and the GPU 330 may directly access the buffer memory 400 by limiting a mapping area of the buffer memory 400 included in each of the first and second storage devices 50_1 and 50_2 and converting a remaining area into a cache area is presented. That is, in the present disclosure, the buffer memory 400 may be configured as a variable mapping area and a cache area. Therefore, in addition to the main memory 320, the cache area of the buffer memory 400 may be used as a cache of dataset.

Figure 2:
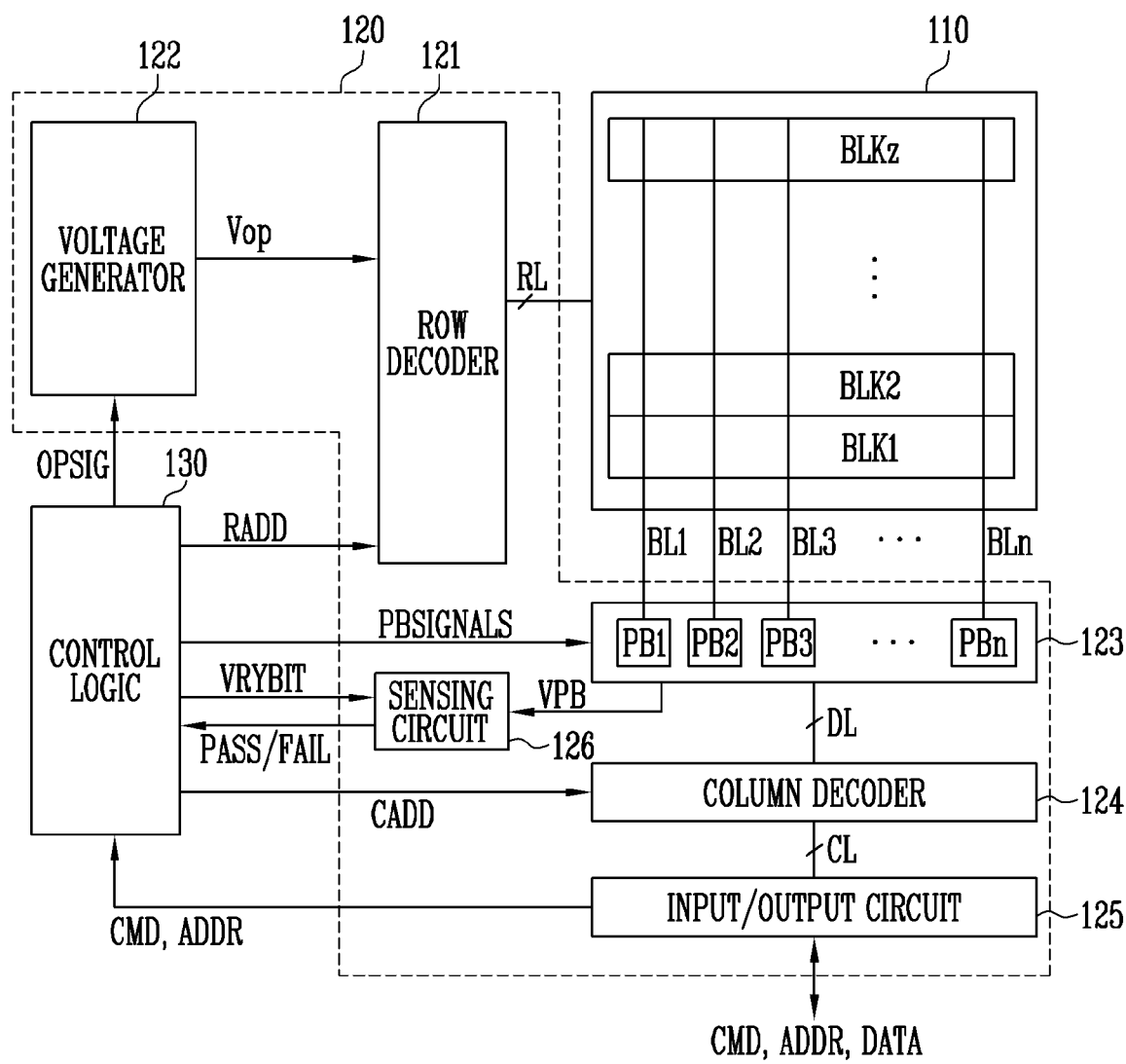
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The plurality of memory blocks BLK1 to BLKz may be connected to the page buffer group 123 through first to n-th bit lines BL1 to BLn. Each of the plurality of memory blocks BLK1 to BLKz includes a plurality of memory cells. In an embodiment, the plurality of memory cells are nonvolatile memory cells. Memory cells connected to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as an SLC that stores one data bit, an MLC that stores two data bits, a TLC that stores three data bits, or a QLC that stores four data bits.

The peripheral circuit 120 may be configured to perform the program operation, the read operation, or the erase operation on a selected area of the memory cell array 110 under control of the control logic 130. The peripheral circuit 120 may drive the memory cell array 110. For example, the peripheral circuit 120 may apply various operation voltages to the row lines RL and the bit lines BL1 to BLn or discharge the applied voltages under the control of the control logic 130.

The peripheral circuit 120 may include a row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 is configured to decode a row address RADD received from the control logic 130. The row decoder 121 selects at least one memory block among the memory blocks BLK1 to BLKz according to a decoded address. In addition, the row decoder 121 may select at least one word line of the memory block selected to apply the voltages generated by the voltage generator 122 to at least one word line WL according to the decoded address.

For example, during the program operation, the row decoder 121 may apply a program voltage to a selected word line and apply a program pass voltage of a level lower than the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage higher than the read voltage to the unselected word line.

In an embodiment, the erase operation of the memory device 100 is performed in a memory block unit. During the erase operation, the row decoder 121 may select one memory block according to the decoded address. During the erase operation, the row decoder 121 may apply a ground voltage to the word lines connected to the selected memory block.

The voltage generator 122 operates in response to the control of the control logic 130. The voltage generator 122 is configured to generate a plurality of voltages using an external power voltage supplied to the memory device 100. Specifically, the voltage generator 122 may generate various operation voltages Vop used for the program, read, and erase operations, in response to an operation signal OPSIG. For example, the voltage generator 122 may generate the program voltage, the verify voltage, the pass voltage, the read voltage, the erase voltage, and the like in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage.

For example, the voltage generator 122 may include a plurality of pumping capacitors that receive the internal power voltage, and may selectively activate the plurality of pumping capacitors to generate the plurality of voltages, in response to the control of the control logic 130.

The generated plurality of voltages may be supplied to the memory cell array 110 by the row decoder 121.

The page buffer group 123 includes first to n-th page buffers PB1 to PBn. The first to n-th page buffers PB1 to PBn are connected to the memory cell array 110 through the first to n-th first to n-th bit lines BL1 to BLn, respectively. The first to n-th page buffers PB1 to PBn operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th first to n-th bit lines BL1 to BLn, or may sense a voltage or a current of the first to n-th bit lines BL1 to BLn during the read or verify operation.

Specifically, during the program operation, when the program voltage is applied to the selected word line, the first to n-th page buffers PB1 to PBn may transfer data DATA received through the input/output circuit 125 to the selected memory cells through the first to n-th bit lines BL1 to BLn. The memory cells of the selected page are programmed according to the transferred data DATA. During the program verify operation, the first to n-th page buffers PB1 to PBn may read page data by sensing the voltage or the current received from the selected memory cells through the first to n-th bit lines BL1 to BLn.

During the read operation, the first to n-th page buffers PB1 to PBn read the data DATA from the memory cells of the selected page through the first to n-th bit lines BL1 to BLn, and output the read data DATA to the input/output circuit 125 under control of the column decoder 124.

During the erase operation, the first to n-th page buffers PB1 to PBn may float the first to n-th bit lines BL1 to BLn or apply the erase voltage.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 of FIG. 1 described with reference to FIG. 1 to the control logic 130, or may exchange data DATA with the column decoder 124.

The sensing circuit 126 may generate a reference current in response to a permission bit signal VRYBIT during the read operation or the verify operation, and compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the permission bit signal VRYBIT in response to the command CMD and the address ADDR to control the peripheral circuit 120. For example, the control logic 130 may control the read operation of the selected memory block in response to a sub block read command and the address. In addition, the control logic 130 may control the erase operation of the selected sub block included in the selected memory block in response to the sub block erase command and the address. In addition, the control logic 130 may determine whether the verify operation has passed or failed in response to the pass signal PASS or the fail signal FAIL.

Figure 3:
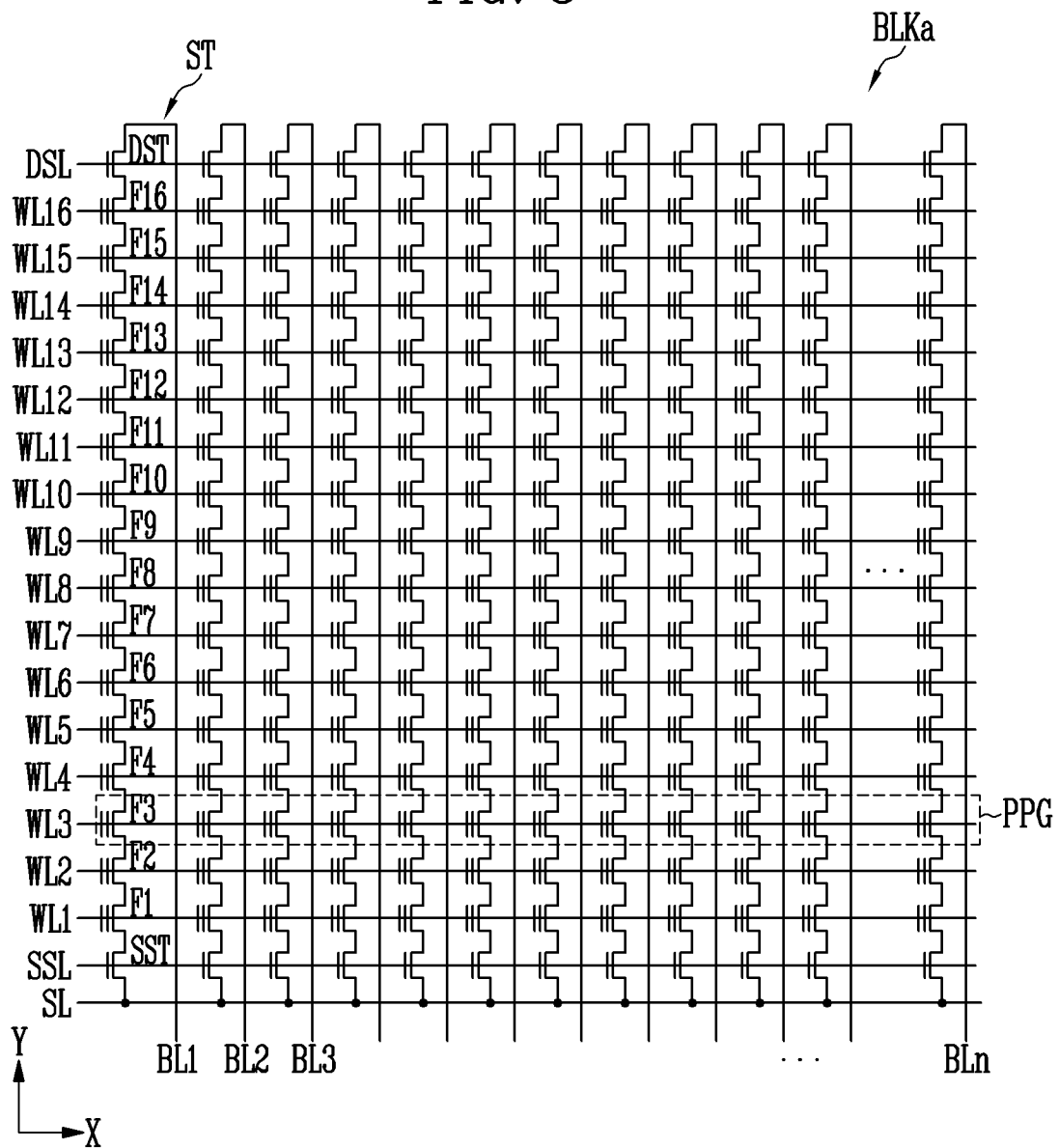
FIG. 3 is a diagram illustrating a memory cell array of FIG. 2 according to an embodiment of the present disclosure.

FIG. 3 is a diagram illustrating an embodiment of the memory cell array of FIG. 2 according to an embodiment of the present disclosure.

Referring to FIGS. 2 and 3, FIG. 3 is a circuit diagram showing a memory block BLKa among the plurality of memory blocks BLK1 to BLKz included in the memory cell array 110 of FIG. 2.

A first select line, word lines, and a second select line arranged in parallel with each other may be connected to the memory block BLKa. For example, the word lines may be arranged in parallel with each other between the first and second select lines. Here, the first select line may be the source select line SSL, and the second select line may be the drain select line DSL.

More specifically, the memory block BLKa may include a plurality of strings connected between the first to n-th bit lines BL1 to BLn and a source line SL. The first to n-th bit lines BL1 to BLn may be connected to the strings, respectively, and the source line SL may be commonly connected to the strings. Since the strings may be configured to be identical to each other, a string ST connected to the first bit line BL1 is specifically described, as an example.

The string ST may include a source select transistor SST, a plurality of memory cells F1 to F16, and a drain select transistor DST connected in series between the source line SL and the first bit line BL1. One string ST may include at least one or more of the source select transistor SST and the drain select transistor DST, and may include memory cells more than the number shown in the drawing.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in the different strings may be connected to the source select line SSL, gates of the drain select transistors DST may be connected to the drain select line DSL, and gates of the memory cells F1 to F16 may be connected to a plurality of word lines WL1 to WL16. A group of the memory cells connected to the same word line among the memory cells included in different strings may be referred to as a physical page PPG. Therefore, the memory block BLKa may include the physical pages PPG of the number of the word lines WL1 to WL16.

One memory cell may store one bit of data. This is commonly referred to as an SLC. In this case, one physical page PPG may store one logical page (LPG) data. One logical page (LPG) data may include data bits of the number of memory cells included in one physical page PPG. In addition, one memory cell may store two or more bits of data. This is commonly referred to as an MLC. In this case, one physical page PPG may store two or more logical page (LPG) data.

A memory cell in which two or more bits of data are stored in one memory cell is referred to as the MLC, but recently, as the number of bits of data stored in one memory cell increases, the MLC refers to a memory cell in which two bits of data is stored, a memory cell in which three or more bits of data are stored is referred to as a TLC, and a memory cell in which four or more bits of data are stored is referred to as a QLC. In addition, a memory cell method in which a plurality of bits of data are stored has been developed, and the present embodiment may be applied to the memory device 100 in which two or more bits of data are stored.

In another embodiment, the memory block may have a three-dimensional structure. Each memory block includes a plurality of memory cells stacked on a substrate. Such plurality of memory cells are arranged along a +X direction, a +Y direction, and a +Z direction.

Figure 4:
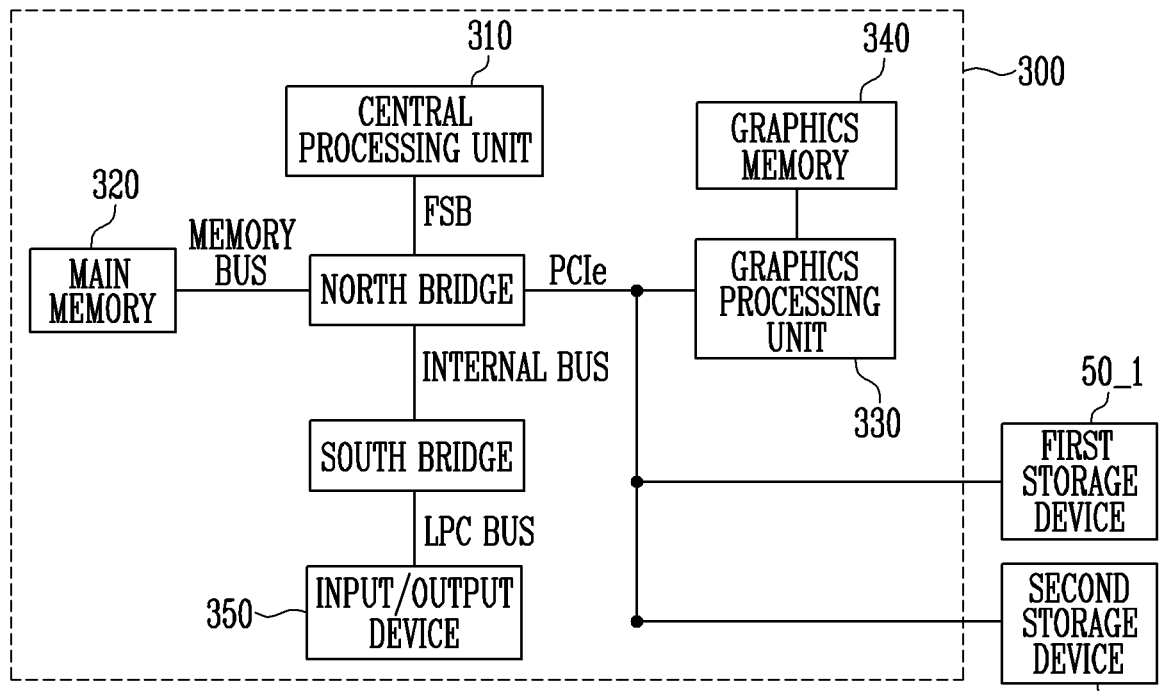
FIG. 4 illustrates a configuration of a host of FIG. 1 and a connection relationship between the host and storage devices according to an embodiment of the present disclosure.

FIG. 4 illustrates a configuration of the host of FIG. 1 and a connection relationship between the host and the storage devices according to an embodiment of the present disclosure.

Referring to FIGS. 1 and 4, FIG. 4 illustrates a connection relationship between components of the host 300 of FIG. 1 and a connection relationship between the host 300 and the first and second storage devices 50_1 and 50_2 of FIG. 1. In FIG. 4, the storage devices are the first and second storage devices 50_1 and 50_2, but a lesser number or a greater number of storage devices may be connected to the host 300.

In an embodiment, a NORTH BRIDGE may include a controller for communication with each component as a memory controller hub, and may be paired with a SOUTH BRIDGE.

In an embodiment, the CPU 310, the main memory 320, the GPU 330, and the first and second storage devices 50_1 and 50_2 may be connected through the NORTH BRIDGE.

For example, the NORTH BRIDGE and the CPU 310 may be connected through a front-side bus (FSB), the NORTH BRIDGE and the main memory 320 may be connected through a MEMORY BUS, the NORTH BRIDGE and the SOUTH BRIDGE may be connected through an INTERNAL BUS, the NORTH BRIDGE, the GPU 330, and the first and second storage devices 50_1 and 50_2 may be connected through a peripheral component interconnect express (PCIe), respectively.

Since the NORTH BRIDGE is directly connected to the CPU 310 through the FSB, an operation requiring relatively high performance may be performed. That is, the NORTH BRIDGE may perform data communication between the CPU 310 and other components.

In an embodiment, the SOUTH BRIDGE may include a controller for communication with each component as an input/output controller hub, and may be paired with the NORTH BRIDGE. For example, the SOUTH BRIDGE may be connected to an input/output device 350 through an LPC BUS.

In an embodiment, the SOUTH BRIDGE may be distinguished from the NORTH BRIDGE in that the SOUTH BRIDGE is generally not directly connected to the CPU 310. That is, the NORTH BRIDGE may connect the SOUTH BRIDGE to the CPU 310. In addition, the SOUTH BRIDGE may directly transmit a signal of the input/output device to the CPU 310 by using a controller integrated channel circuit for data control and access.

Figure 5:
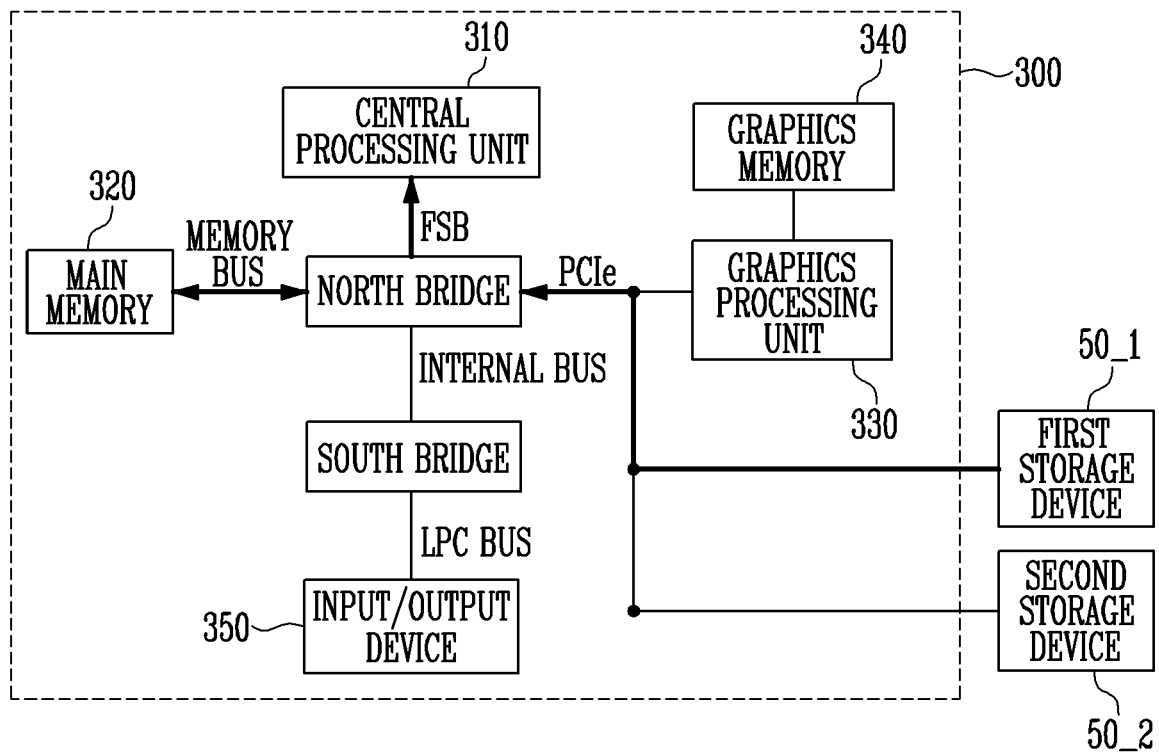
FIG. 5 illustrates a process in which data is output from the storage device according to an embodiment of the present disclosure.

FIG. 5 illustrates a process in which data is output from the storage device according to an embodiment of the present disclosure.

Referring to FIGS. 4 and 5, FIG. 5 illustrates the components of the host 300 of FIG. 4, and the first and second storage devices 50_1 and 50_2. FIG. 5 illustrates a process in which data is output according to a read request of the host 300.

In an embodiment, the host 300 may request data stored in the first storage device 50_1. When the read request for requesting the data stored in the first storage device 50_1 is output from the host 300, the first storage device 50_1 may output corresponding data in response to the read request.

Specifically, the memory controller included in the first storage device 50_1 may generate a read command corresponding to the read request and output the read command to the memory device. When the memory device receives the read command from the memory controller, the memory device may read the corresponding data by performing a read operation corresponding to the read command and output the read data to the memory controller. The memory controller may output the read data received from the memory device to the host 300.

In an embodiment, the read data output from the first storage device 50_1 may be transmitted to the main memory 320 through the NORTH BRIDGE, and the main memory 320 may store the read data output from the first storage device 50_1.

Thereafter, the CPU 310 may perform a subsequent operation based on the data stored in the main memory 320.

In an embodiment, the CPU 310 may obtain data read from each storage device by accessing the main memory 320. However, in order to limit a size of the main memory 320 and improve an operation speed of the CPU 310, in the present disclosure, a method in which each storage device allocates a cache area to the buffer memory and the CPU 310 access the allocated cache area is presented.

Furthermore, in the present disclosure, a method in which each storage device allocates the cache area to the buffer memory for the machine learning or the deep learning is presented.

Figure 6:
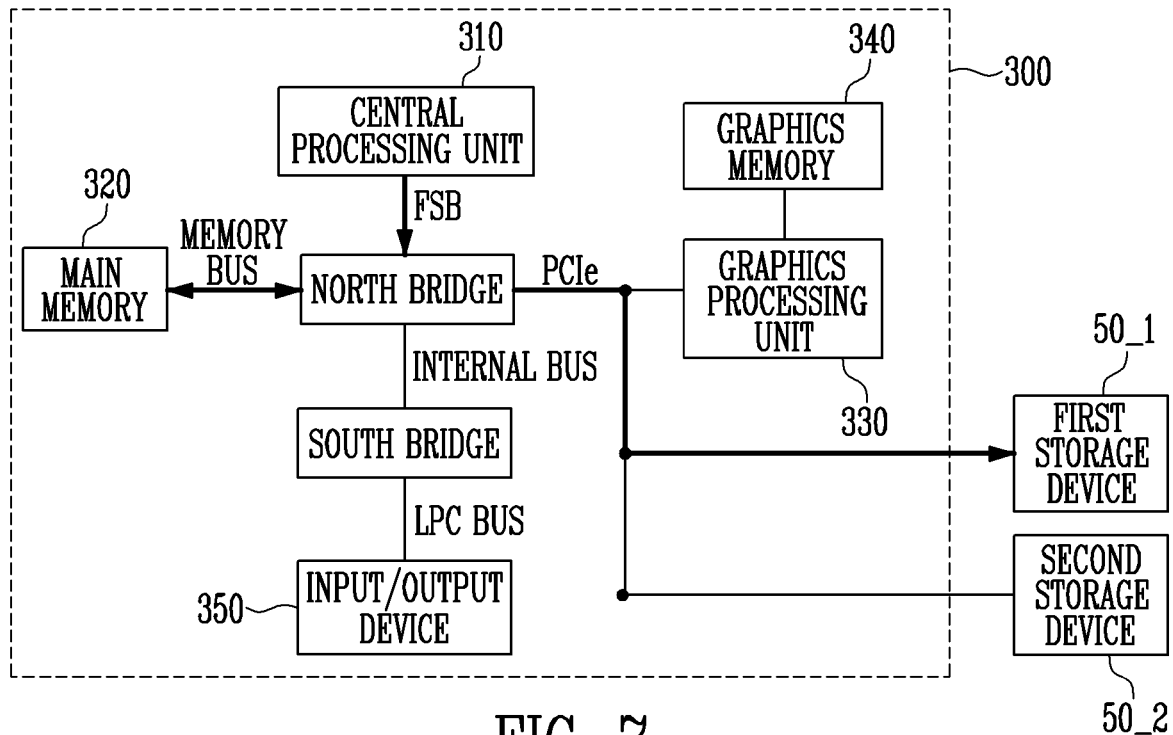
FIG. 6 illustrates a process in which data is output from the host according to an embodiment of the present disclosure.

FIG. 6 illustrates a process in which data is output from the host according to an embodiment of the present disclosure.

Referring to FIGS. 4 and 6, FIG. 6 illustrates components of the host 300 of FIG. 4, and the first and second storage devices 50_1 and 50_2. FIG. 6 illustrates a process in which data is output according to a write request of the host 300.

In an embodiment, the host 300 may request to store data in the first storage device 50_1. When the write request for storing data in the first storage device 50_1 is output from the host 300, data of the main memory 320 corresponding to the write request may be output together with the write request.

Specifically, the write request of the CPU 310 and the data of the main memory 320 may be transmitted to the first storage device 50_1 through the NORTH BRIDGE. The memory controller included in the first storage device 50_1 may receive the write request, generate a write command corresponding to the write request, and output the write command to the memory device.

Thereafter, when the memory device receives the write command from the memory controller, the memory device may store the data received from the main memory 320 in the memory cell array by performing a write operation (program operation) corresponding to the write command.

In an embodiment, the CPU 310 may obtain data to be stored in the storage device by accessing the main memory 320. However, in order to limit the size of the main memory 320 and improve the operation speed of the CPU 310, in the present disclosure, a method in which each storage device allocates the cache area to the buffer memory and the CPU 310 accesses the allocated cache area is presented.

Furthermore, in the present disclosure, a method in which each storage device allocates the cache area to the buffer memory for machine learning or deep learning is presented.

Figure 7:
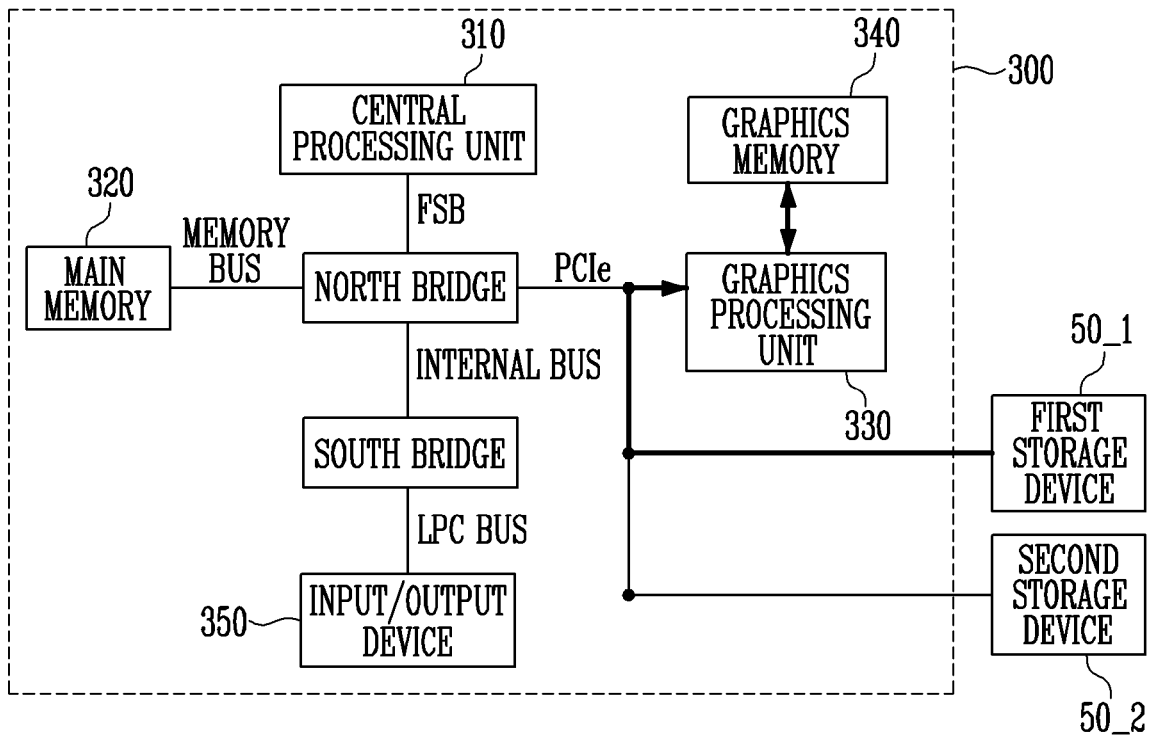
FIG. 7 illustrates a process in which graphic data is output from the storage device according to an embodiment of the present disclosure.

FIG. 7 illustrates a process in which graphic data is output from the storage device according to an embodiment of the present disclosure.

Referring to FIGS. 4 and 7, FIG. 7 illustrates the components of the host 300 of FIG. 4, and the first and second storage devices 50_1 and 50_2. FIG. 7 illustrates a process in which graphic data is output according to a graphic data read request of the host 300.

In an embodiment, the host 300 may request the graphic data stored in the first storage device 50_1. When the read request for requesting the graphic data stored in the first storage device 50_1 is output from the host 300, the first storage device 50_1 may output corresponding data in response to the read request.

Specifically, the memory controller included in the first storage device 50_1 may generate a read command corresponding to the read request and output the read command to the memory device. When the memory device receives the read command from the memory controller, the memory device may read the corresponding data by performing a read operation corresponding to the read command and output the read data to the memory controller. The memory controller may output the read data received from the memory device to the host 300.

In an embodiment, the read data output from the first storage device 50_1 may be transmitted to the graphics memory 340 through the GPU 330, and the graphics memory 340 may store the read data output from the first storage device 50_1.

Thereafter, the GPU 330 may perform a subsequent operation based on the data stored in the graphics memory 340.

In an embodiment, the GPU 330 may obtain the graphic data read from each storage device by accessing the graphics memory 340. However, in order to limit a size of the graphics memory 340 and improve an operation speed of the GPU 330, in the present disclosure, a method in which each storage device allocates the cache area to the buffer memory and the GPU 330 accesses the allocated cache area is presented.

Furthermore, in the present disclosure, a method in which each storage device allocates the cache area to the buffer memory for machine learning or deep learning is presented.

Figure 8:
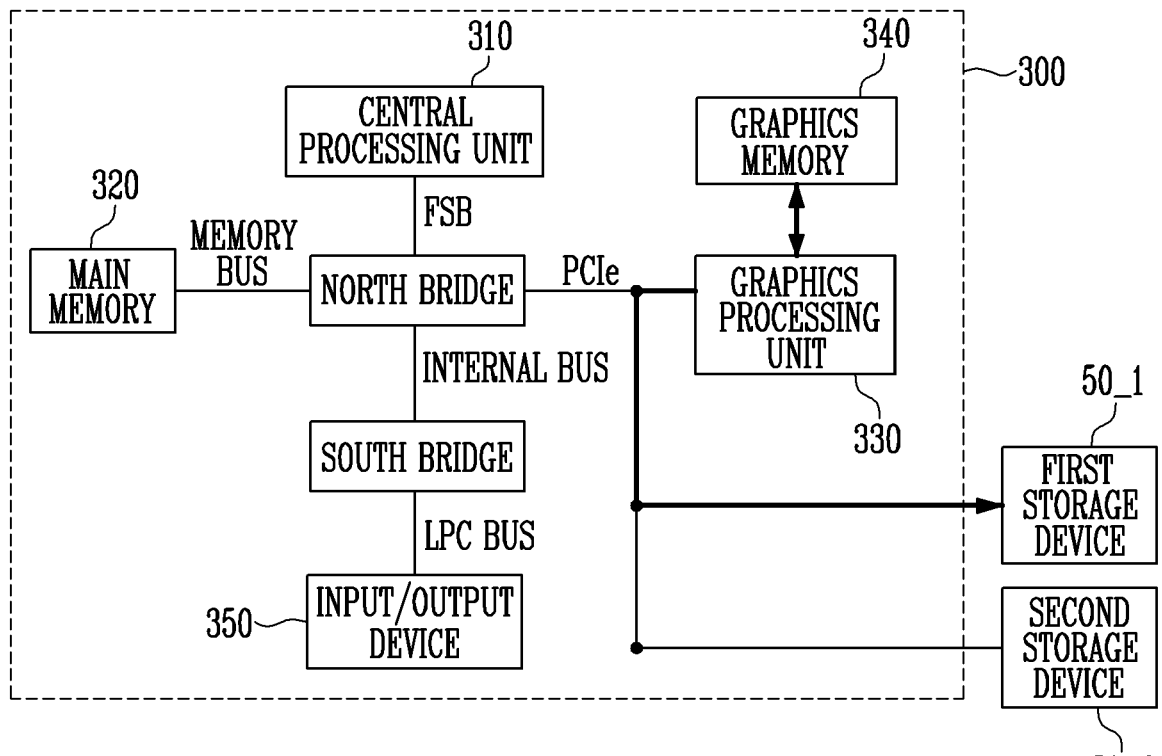
FIG. 8 illustrates a process in which the graphic data is output from the host according to an embodiment of the present disclosure.

FIG. 8 illustrates a process in which the graphic data is output from the host according to an embodiment of the present disclosure.

Referring to FIGS. 4 and 8, FIG. 8 illustrates components of the host 300 of FIG. 4, and the first and second storage devices 50_1 and 50_2. FIG. 8 illustrates a process in which data is output according to a graphic data write request of the host 300.

In an embodiment, the host 300 may request to store graphic data in the first storage device 50_1. When the write request for storing the graphic data in the first storage device 50_1 is output from the host 300, the graphic data of the graphics memory 340 corresponding to the write request may be output together with the write request.

Specifically, the write request of the GPU 330 and the graphic data of the graphics memory 340 may be transmitted to the first storage device 50_1 through the PCIe interface. The memory controller included in the first storage device 50_1 may receive the write request, generate a write command corresponding to the write request, and output the write command to the memory device.

Thereafter, when the memory device receives the write command from the memory controller, the memory device may store the graphic data received from the graphics memory 340 in the memory cell array by performing a write operation (program operation) corresponding to the write command.

In an embodiment, the GPU 330 may obtain data to be stored in the storage device by accessing the graphics memory 340. However, in order to limit the size of the graphics memory 340 and improve the operation speed of the GPU 330, in the present disclosure, a method in which each storage device allocates the cache area to the buffer memory and the GPU 330 accesses the allocated cache area is presented.

Furthermore, in the present disclosure, a method in which each storage device allocates the cache area to the buffer memory for machine learning or deep learning is presented.

Figure 9:
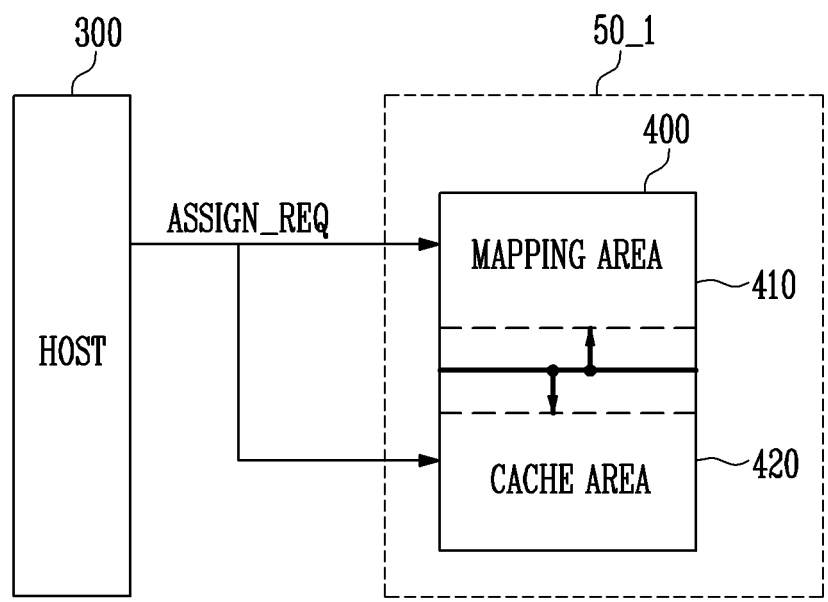
FIG. 9 illustrates a method in which a mapping area and a cache area are allocated to a buffer memory according to an embodiment of the present disclosure.

FIG. 9 illustrates a method in which the mapping area and the cache area are allocated to the buffer memory according to an embodiment of the present disclosure.

Referring to FIGS. 1 and 9, FIG. 9 illustrates the host 300 and the buffer memory 400 included in the first storage device 50_1 of the first and second storage devices 50_1 and 50_2 of FIG. 1. FIG. 9 shows only the first storage device 50_1, but the contents of the present disclosure may be equally applied to the second storage device 50_2.

Mapping data indicating a mapping relationship between the LBA and the PBA may be stored in the buffer memory 400 of FIG. 9. Furthermore, in the present disclosure, the data received from the CPU 310 of FIG. 1 and the GPU 330 of FIG. 1 may be stored in the buffer memory 400 in addition to the mapping data.

In an embodiment, the host 300 may output an allocation request ASSIGN_REQ to the first storage device 50_1. For example, the CPU 310 of FIG. 1 included in the host 300 may output the allocation request ASSIGN_REQ to the first storage device 50_1. The allocation request ASSIGN_REQ may be a request instructing to allocate an area in which data except for the mapping data is to be stored in the buffer memory 400.

That is, the host 300 may request to divide an area of the buffer memory 400 into a mapping area 410 in which the mapping data is stored and a cache area 420 in which the data except for the mapping data is stored and allocate a portion of the mapping area 410 to the cache area 420. The buffer memory 400 may allocate the mapping area 410 and the cache area 420 based on the allocation request ASSIGN_REQ received from the host 300.

Here, the data of the main memory 320 of FIG. 1 and the graphics memory 340 of FIG. 1 may be cached in the cache area 420. That is, data may be cached in the cache area 420 so that the host 300 may directly access the first storage device 50_1 without accessing the main memory 320 of FIG. 1 and the graphics memory 340 of FIG. 1.

In an embodiment, the data stored in the memory device 100 of FIG. 1 may be sequentially cached in the buffer memory 400, and the data to be output to the host 300 may be cached in advance. Therefore, a data throughput of the first storage device 50_1 may be increased.

In addition, the host 300 may vary sizes of the mapping area 410 and the cache area 420 to be allocated to the buffer memory 400 through the allocation request ASSIGN_REQ.

For example, the host 300 may output the allocation request ASSIGN_REQ instructing to vary the mapping area 410 and the cache area 420 according to an operation efficiency of the CPU 310 of FIG. 1 and the GPU 330 of FIG. 1 to the first storage device 50_1. That is, the host 300 may adjust a conversion rate from the mapping area 410 to the cache area 420 of the buffer memory 400.

Specifically, when the data throughput of the CPU 310 of FIG. 1 and the GPU 330 of FIG. 1 increases, the host 300 may increase the cache area 420 (decrease the mapping area 410). When the data throughput of the CPU 310 of FIG. 1 and the GPU 330 of FIG. 1 decreases, the host 300 may decrease the cache area 420 (increase the mapping area 410).

In an embodiment, the host 300 may directly access the first storage device 50_1 without accessing the main memory 320 of FIG. 1, by converting a portion of the mapping area 410 of the buffer memory 400 into the cache area 420. Therefore, a process speed of data may be increased.

Furthermore, when the portion converted into the cache area 420 is not used, that is, when the cache area 420 is not accessed, the first storage device 50_1 may limit power applied to the cache area 420 to switch to a power saving state.

In an embodiment, when a new allocation request ASSIGN_REQ is not received from the host 300, a ratio of the mapping area 410 to the cache area 420 allocated to the buffer memory 400 may be maintained. In addition, as the ratio of the mapping area 410 to the cache area 420 is maintained, the mapping data of the mapping area 410 may be used as it is.

However, when the new allocation request ASSIGN_REQ is received from the host 300, the mapping area 410 and the cache area 420 may be allocated at a new ratio adjusted according to the allocation request ASSIGN_REQ.

Figure 10:
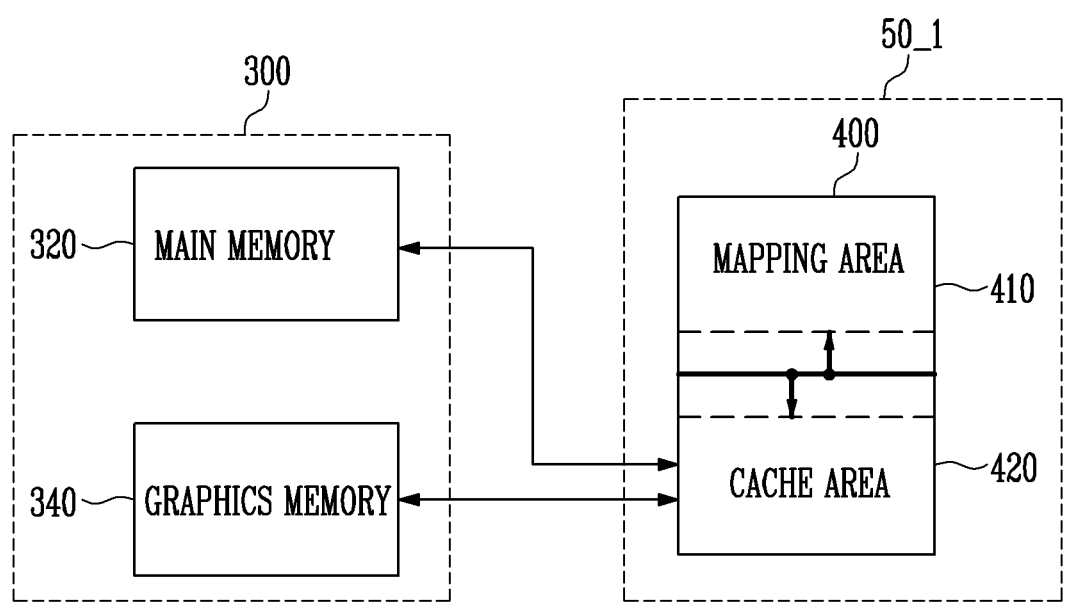
FIG. 10 illustrates data transmission between a main memory and a graphics memory and the cache area after allocating each area of the buffer memory according to an embodiment of the present disclosure.

FIG. 10 illustrates data transmission between the main memory and the graphics memory and the cache area after allocating each area of the buffer memory according to an embodiment of the present disclosure.

Referring to FIGS. 9 and 10, FIG. 10 illustrates the main memory 320 and the graphics memory 340 included in the host 300 of FIG. 9, and the mapping area 410 and the cache area 420 of the buffer memory 400 divided according to the allocation request ASSIGN_REQ of the host 300 of FIG. 9.

In an embodiment, when the buffer memory 400 is divided into the mapping area 410 and the cache area 420 by the allocation request ASSIGN_REQ, the data of the main memory 320 and the graphics memory 340 may be stored in the cache area 420. In addition, the data to be output to the host 300 may be cached in the cache area 420 in advance. Therefore, a data process speed of the host 300 and the first storage device 50_1 may be improved.

In an embodiment, when the data of the main memory 320 and the graphics memory 340 are stored in the cache area 420, the CPU 310 and the GPU 330 may access the first storage device 50_1 without data movement in the main memory 320 and the graphics memory 340.

At this time, when a new allocation request ASSIGN_REQ is received from the host 300 and the cache area 420 is increased, a greater number of data of the main memory 320 and the graphics memory 340 may be stored in the cache area 420. In addition, the number of times the CPU 310 and the GPU 330 directly access the first storage device 50_1 may increase.

Conversely, when the new allocation request ASSIGN_REQ is received from the host 300 and the cache area 420 is decreased, the number of data that may be stored in the cache area 420 may be decreased. In addition, the number of times the CPU 310 and the GPU 330 directly access the first storage device 50_1 may be decreased.

Figure 11:
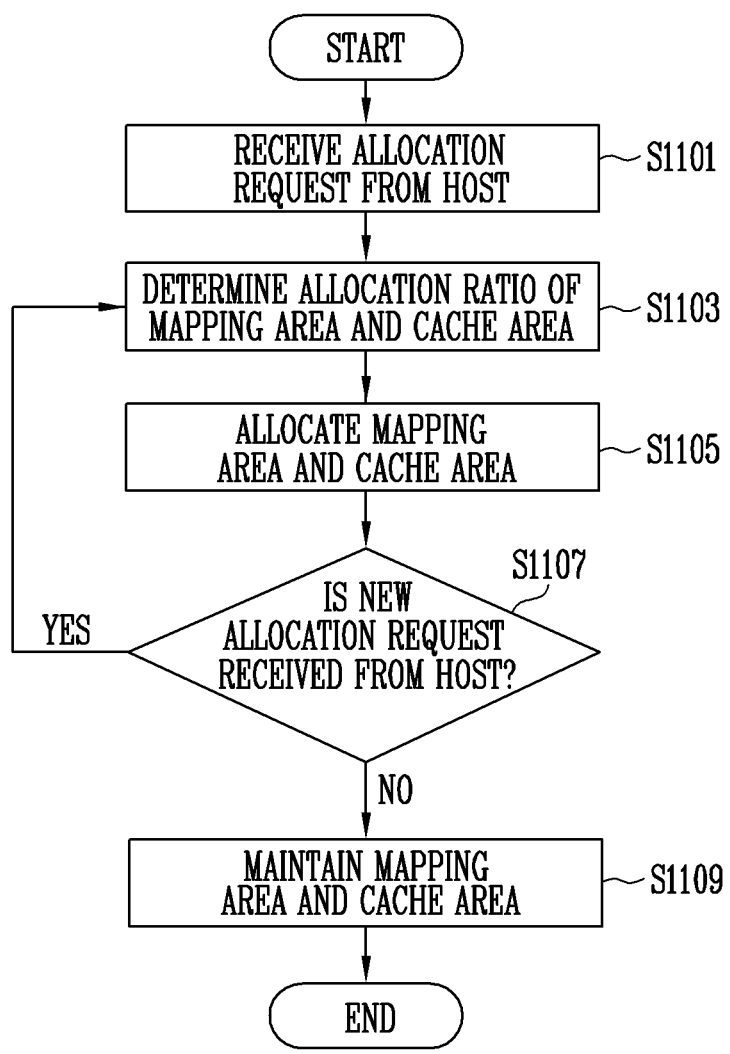
FIG. 11 is a diagram illustrating an operation of a storage device according to an embodiment of the present disclosure.

FIG. 11 is a diagram illustrating an operation of a storage device according to an embodiment of the present disclosure.

Referring to FIG. 11, in operation S1101, the storage device may receive the allocation request from the host. For example, the CPU included in the host may output the allocation request to the storage device.

The allocation request may be the request instructing to allocate a portion of the mapping area of the buffer memory included in the storage device to the cache area. Here, the mapping data indicating the mapping relationship between the LBA and the PBA may be stored in the mapping area, and the data except for the mapping data may be stored in the cache area.

In operation S1103, the storage device may determine the allocation ratio of the mapping area and the cache area based on the allocation request received from the host.

For example, when the data throughput of the CPU and the GPU included in the host is increased, the cache area may be allocated as a relatively large area. However, when the data throughput of the CPU and the GPU is decreased, the cache area may be allocated as a relatively small area.

In operation S1105, the storage device may allocate the mapping area and the cache area according to the determined allocation ratio. When the mapping area and the cache area are allocated, the mapping data may be cached in the mapping area, and the data received from the host or the data to be output from the memory device to the host may be cached in the cache area in advance. At this time, when the cache area is not used, that is, when the cache area is not accessed, the storage device may change the power to the cache area to the power saving state.

In operation S1107, the storage device may determine whether the new allocation request is received from the host. Here, the new allocation request may be a request instructing to reset the allocation ratio of the mapping area and the cache area.

When the new allocation request is received from the host (Y), the method may proceed to operation S1103, and the storage device may allocate the mapping area and the cache area by determining the allocation ratio of the mapping area and the cache area again based on the allocation request.

However, when the new allocation request is not received from the host (N), the method may proceed to operation S1109.

In operation S1109, the storage device may maintain the allocation of the mapping area and the cache area set by a previous allocation request. That is, the storage device may cache the data except for the mapping data in the cache area allocated with a portion of the mapping area, and use the mapping data stored in the mapping area as it is.

Figure 12:
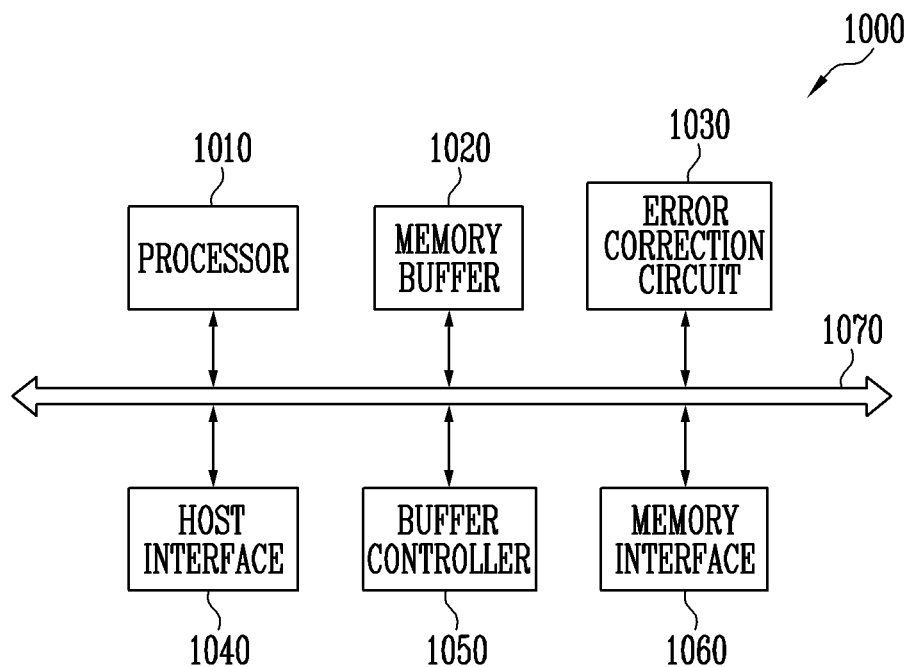
FIG. 12 is a diagram illustrating another embodiment of a memory controller of FIG. 1 according to the present disclosure.

FIG. 12 is a diagram illustrating another embodiment of the memory controller of FIG. 1 according to the present disclosure.

The memory controller 1000 is connected to a host and the memory device. The memory controller 1000 is configured to access the memory device in response to the request from the host. For example, the memory controller 1000 is configured to control write, read, erase, and background operations of the memory device. The memory controller 1000 is configured to provide an interface between the memory device and the host. The memory controller 1000 is configured to drive firmware for controlling the memory device.

Referring to FIG. 12, the memory controller 1000 may include a processor 1010, a memory buffer 1020, an error correction circuit (ECC) 1030, a host interface 1040, a buffer controller or a buffer control circuit 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of the FTL. The processor 1010 may convert the LBA provided by the host into the PBA through the FTL. The FTL may receive the LBA and convert the LBA into the PBA by using a mapping table. An address mapping method of the flash translation layer includes a plurality of mapping methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction circuit 1030 may perform error correction. The error correction circuit 1030 may perform error correction encoding (ECC encoding) based on data to be written to the memory device through a memory interface 1060. The error correction encoded data may be transferred to the memory device through the memory interface 1060. The error correction circuit 1030 may perform error correction decoding (ECC decoding) on the data received from the memory device through the memory interface 1060. For example, the error correction circuit 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device, for example, a read only memory, provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error correction circuit 1030, and the memory interface 1060. The control bus may be connected to the host interface 1040, the processor 1010, the buffer controller 1050, the memory buffer 1020, and the memory interface 1060.

Figure 13:
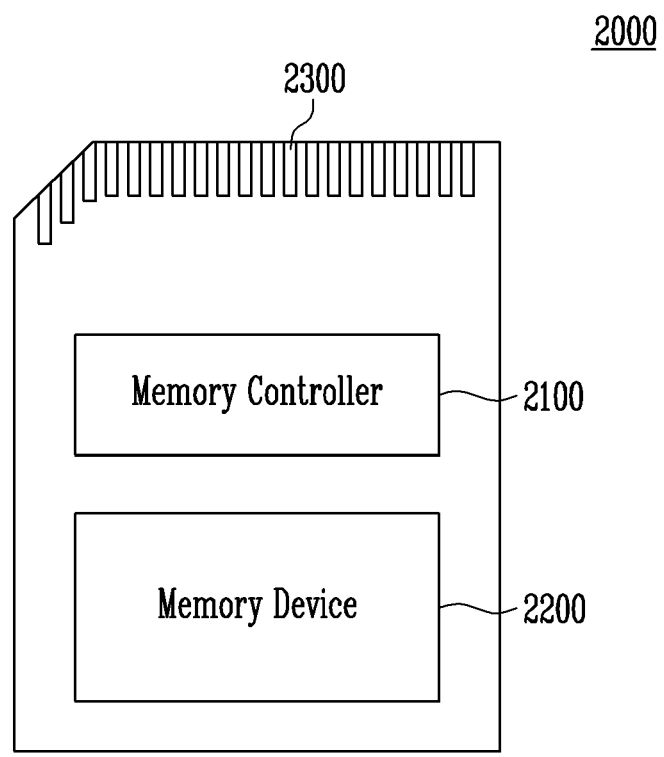
FIG. 13 is a block diagram illustrating a memory card system to which a storage device according to an embodiment of the present disclosure is applied.

FIG. 13 is a block diagram illustrating a memory card system to which a storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and the host. The memory controller 2100 is configured to drive firmware for controlling the memory device 2200. The memory device 2200 may be implemented identically to the memory device 100 of FIG. 1 described with reference to FIG. 1.

As an example, the memory controller 2100 may include components such as a random access memory (RAM), a processor, a host interface, a memory interface, and an error correction circuit.

The memory controller 2100 may communicate with an external device through the connector 2300. The memory controller 2100 may communicate with an external device, for example, the host, according to a specific communication standard. As an example, the memory controller 2100 is configured to communicate with an external device through at least one of various communication standards or interfaces, such as a universal serial bus (USB), a multi-media card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. As an example, the connector 2300 may be defined by at least one of the various communication standards described above.

As an example, the memory device 2200 may be implemented as various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
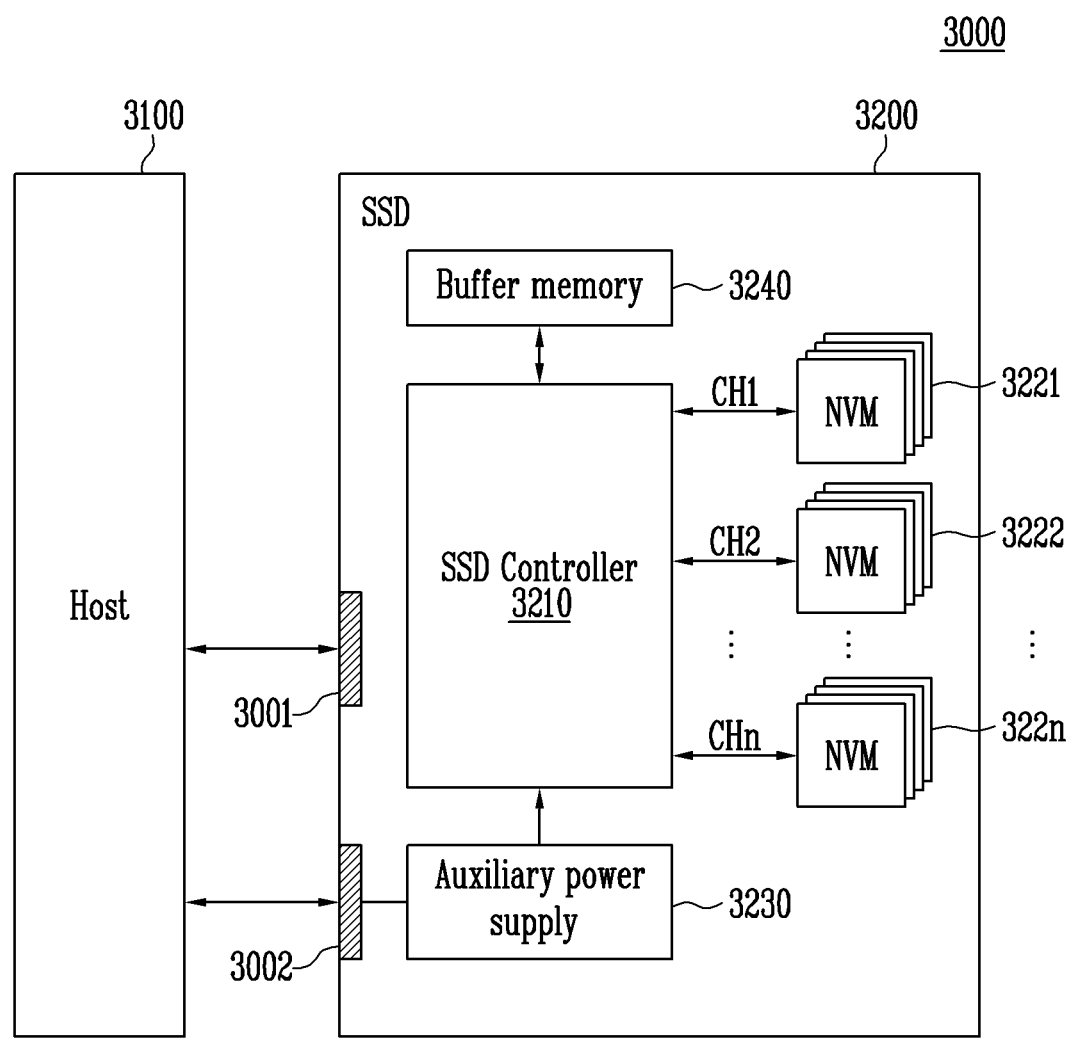
FIG. 14 is a block diagram exemplary illustrating a solid state drive (SSD) system to which a storage device according to an embodiment of the present disclosure is applied.

FIG. 14 is a block diagram exemplary illustrating a solid state drive (SSD) system to which a storage device according to an embodiment of the present disclosure is applied.

Referring to FIG. 14, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories or Non-Volatile Memories (NVMs) 3221 to 322n, an auxiliary power device 3230, and a buffer memory 3240.

In an embodiment, the SSD controller 3210 may perform a function of the memory controller 200 of FIG. 1 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of interfaces such as a universal serial bus (USB), a multi-media card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata, for example, a mapping table, of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 15:
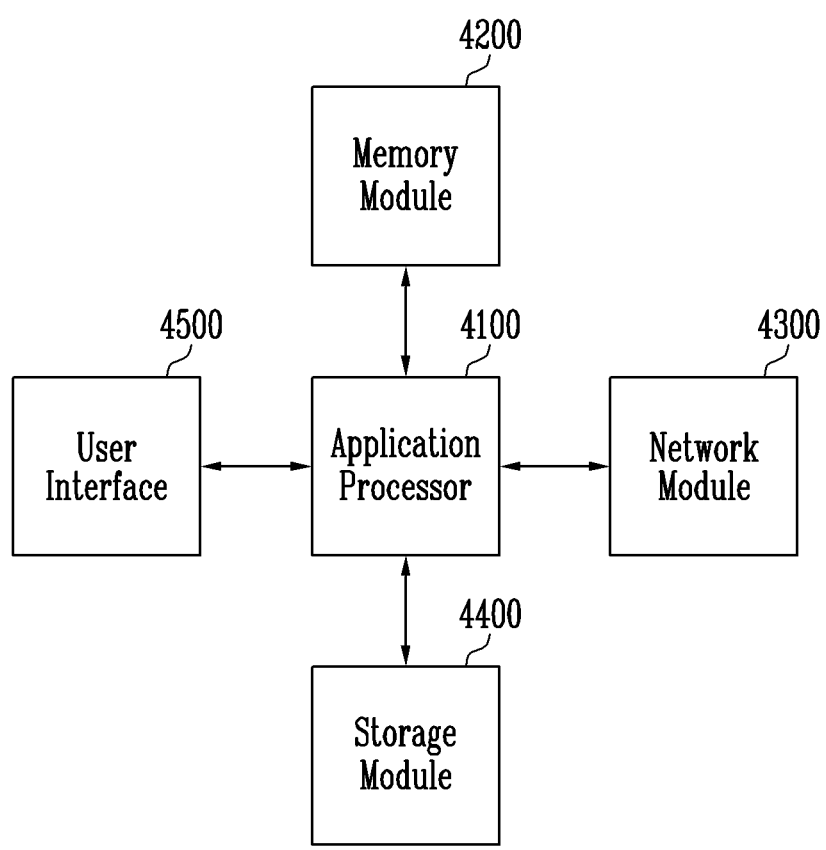
FIG. 15 is a block diagram illustrating a user system to which a storage device according to an embodiment of the present disclosure is applied.

FIG. 15 is a block diagram illustrating a user system to which a storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device described with reference to FIGS. 2 and 3. The storage module 4400 may operate identically to the first and second storage devices 50_1 and 50_2 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

While certain embodiments have been described above, it will be understood to those skilled in the art that the embodiments described are by way of example only. Accordingly, the host device, storage device and method for operating thereof should not be limited based on the described embodiments. Rather, the host device, storage device and method for operating thereof described herein should only be limited in light of the claims that follow when taken in conjunction with the above description and accompanying drawings. Furthermore, the embodiments may be combined to form additional embodiments.

What is claimed is:

1. A storage device comprising:
a memory device including a plurality of memory cells;
a memory controller configured to control an operation performed on the memory device; and
a buffer memory including a cache area and a mapping area in which mapping data indicating a mapping relationship between a logical block address and a physical block address corresponding to the operation is stored,
wherein the memory controller is configured to control the buffer memory to allocate a portion of the mapping area to the cache area according to an allocation request received from a host, and to store data except for the mapping data in the cache area, and
wherein the memory controller controls the buffer memory to allocate the portion by adjusting the cache area according to data throughput of an internal device of the host.

2. The storage device of claim 1, wherein the buffer memory stores the data by caching, in the cache area, data to be output from the memory device to the host through the memory controller.

3. The storage device of claim 1, wherein the buffer memory stores the data by caching, in the cache area, data to be output from the host.

4. The storage device of claim 1, wherein the memory controller controls the buffer memory to allocate the portion by increasing the cache area as the data throughput of the host increases.

5. The storage device of claim 1, wherein the memory controller controls the buffer memory to allocate the portion by decreasing the cache area as the data throughput of the host decreases.

6. The storage device of claim 1, wherein power applied to the cache area is changed to a power saving state except for a case where the cache area is accessed.

7. The storage device of claim 1, wherein the memory controller determines whether to change an allocation ratio of the mapping area and the cache area based on whether a new allocation request is received from the host.

8. The storage device of claim 7, wherein the memory controller determines whether to change the allocation ratio by maintaining the allocation ratio of the mapping area and the cache area except for a case where the new allocation request is received from the host.

9. The storage device of claim 7, wherein the memory controller determines whether to change the allocation ratio by changing the allocation ratio of the mapping area and the cache area according to the new allocation request, when receiving the new allocation request from the host.

10. A method of operating a storage device comprising a memory device including a plurality of memory cells, a memory controller controlling an operation performed on the memory device, and a buffer memory, the method comprising:
　receiving an allocation request instructing to divide and allocate areas included in the buffer memory from a host;
　allocating to a cache area, a portion of a mapping area in which mapping data indicating a mapping relationship between a logical block address and a physical block address corresponding to the operation is stored, according to the allocation request;
　storing data except for the mapping data in the cache area; and,
　adjusting the cache area according to data throughput of an internal device of the host.

11. The method of claim 10, wherein the storing the data in the cache area includes caching in the cache area, data to be output from the memory device to the host through the memory controller.

12. The method of claim 10, wherein the storing the data in the cache area includes caching in the cache area, data to be output from the host.

13. The method of claim 10, wherein the allocating the portion of the mapping area to the cache area includes increasing the cache area as a data throughput of the host increases.

14. The method of claim 10, wherein the allocating the portion of the mapping area to the cache area includes decreasing the cache area as a data throughput of the host decreases.

15. The method of claim 10, further comprising changing power applied to the cache area to a power saving state except for a case where the cache area is accessed.

16. The method of claim 10, further comprising determining whether to change an allocation ratio of the mapping area and the cache area based on whether a new allocation request is received from the host.

17. The method of claim 16, wherein the determining whether to change the allocation ratio of the mapping area and the cache area includes maintaining the allocation ratio of the mapping area and the cache area except for a case where the new allocation request is received from the host.

18. The method of claim 16, wherein the determining whether to change the allocation ratio of the mapping area and the cache area includes changing the allocation ratio of the mapping area and the cache area according to the new allocation request, when the new allocation request is received from the host.

19. A host device comprising:
　a central processing unit configured to execute and process an operation to be performed on a storage device;
　a main memory configured to store data corresponding to the operation processed by the central processing unit;
　a graphics processing unit configured to process a graphic operation and output a result value; and
　a graphics memory configured to store the result value,
　wherein the central processing unit is further configured to output an allocation request for requesting to allocate a portion of a mapping area of a buffer memory included in the storage device to a cache area of the buffer memory, and to store the data in the cache area, and
　wherein the cache area is adjusted according to data throughput of the central processing unit and the graphics processing unit.

20. The host device of claim 19, wherein an allocation ratio of the cache area and the mapping area is determined according to the data throughput processed by the central processing unit and the graphics processing unit.

* * * * *